May 17, 1932.　　W. A. McCAULEY　　1,858,636
COOKING APPARATUS
Filed June 2, 1931
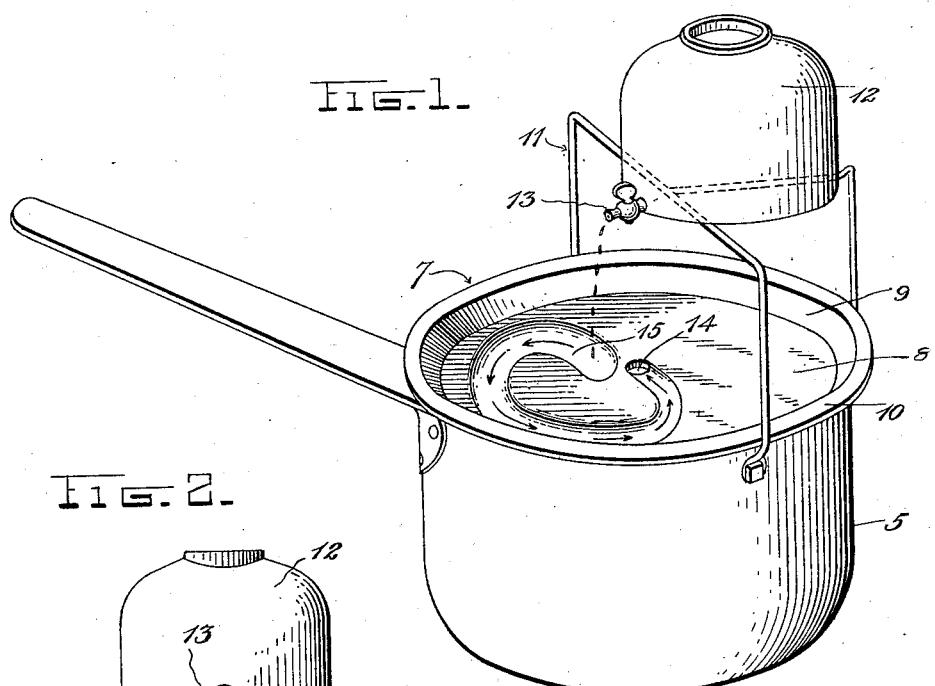
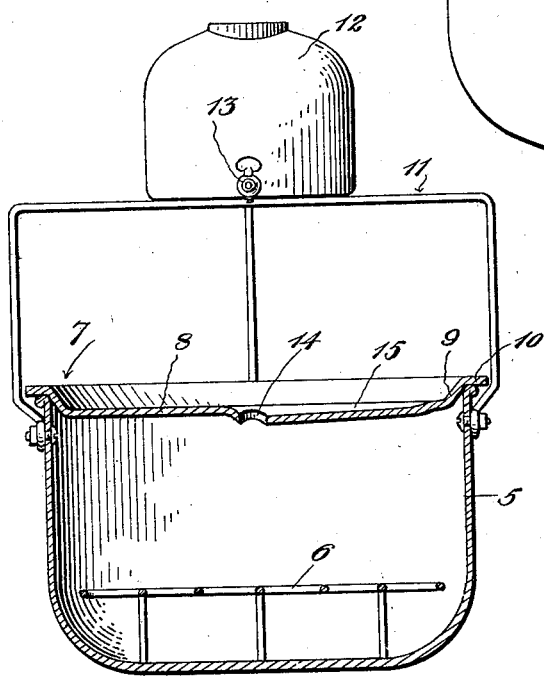
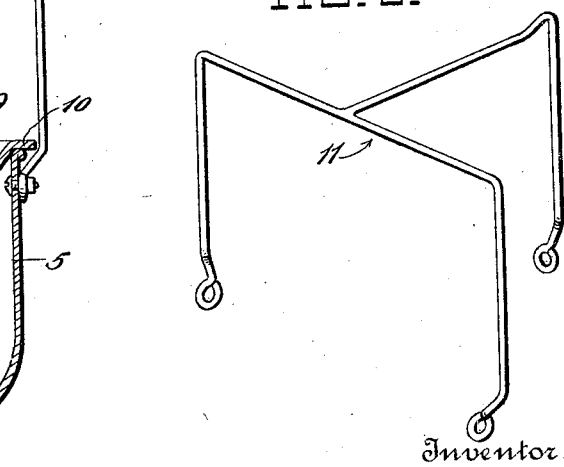
Inventor
W. A. McCauley
By H. B. Willson &Co
Attorneys.
Witness
E. Hunt.

Patented May 17, 1932

1,858,636

UNITED STATES PATENT OFFICE

WILLIAM ARTHUR McCAULEY, OF TULSA, OKLAHOMA, ASSIGNOR OF ONE-THIRD TO JOHN LEE RALEIGH, OF TULSA, OKLAHOMA

COOKING APPARATUS

Application filed June 2, 1931. Serial No. 541,715.

The invention relates to a novel apparatus for cooking beans, meat or other food by boiling, and it aims to provide a new and improved contrivance whereby all water which becomes vaporized in the pot containing the food, is replaced by hot water, so that the housewife or cook need not give constant attention to the cooking operation, and nevertheless the pot cannot boil totally or partially dry with danger that the food shall be unevenly cooked or scorched.

With the foregoing in view, the invention resides in the novel subject matter hereinafter described and claimed, description being accomplished by reference to the accompanying drawings.

Fig. 1 is a perspective view of an apparatus constructed in accordance with the invention.

Fig. 2 is a sectional view partly in elevation.

Fig. 3 is a perspective view of the rack which supports the water reservoir.

The cooking kettle or pot 5 may be of any desired form, and when meat is to be cooked, I preferably place a wire rack 6 in said kettle or pot, as shown in Fig. 2, for supporting the meat out of contact with the receptacle bottom.

A metal top 7 is provided for the pot or the like 5, said top preferably having a substantially flat bottom 8, a continuous side wall 9, and a continuous rim flange 10, said wall 9 fitting within the upper portion of the pot 5 and the flange 10 resting upon the latter.

An appropriate rack 11 is provided to support a suitable water reservoir 12 above the top 7. This reservoir is provided with a petcock or the like 13 for discharging a slow stream of water onto the top 7, and the stream may either be a continuous small stream or a mere dripping stream. The water discharged from the pet-cock or the like 13 becomes highly heated by contact with the top 7, and this heated water discharges through an opening 14 in said top, into the pot 5. By properly regulating the stream, it may be insured that all water which vaporizes or "boils away" in the pot 5, will be replaced with water discharged from the reservoir 12 and heated by contact with the top 7. Thus, the cooking operation requires no attention from start to finish and it is insured that the food shall be uniformly cooked without any danger whatever of becoming partially dried out or scorched.

In the preferred construction, the bottom 9 of the top 7 is provided with an elongated channel 15 formed by downwardly stamping a restricted portion of said bottom. The opening 14 is at one end of this channel and the stream from the pet-cock or the like 13, is discharged into the other end, the bottom of the channel being declined to the opening 14. The channel 15 may obviously be of any desired shape and length and of any appropriate transverse formation.

The details disclosed have proven highly efficient and desirable and are preferably followed. However, within the scope of the invention as claimed, variations may of course be made.

I claim:—

1. A cooking apparatus comprising a cooking pot, a heat-absorbing top for said pot, and a water reservoir provided with means for discharging a slow stream of water onto said top, whereby the water so discharged will become highly heated, said top having an opening for discharging the hot water into the pot to compensate for water which has vaporized in said pot.

2. A cooking apparatus comprising a cooking pot, a heat-absorbing top for said pot, said top being provided with a water conducting and heating channel and having an opening from said channel into said pot, and a water reservoir provided with means for discharging a slow stream of water into said channel, whereby the water so discharged will become highly heated and will enter the pot to compensate for water which has vaporized in said pot.

In testimony whereof I affix my signature.

WILLIAM ARTHUR McCAULEY.